United States Patent Office 3,340,225
Patented Sept. 5, 1967

3,340,225
1,8-NAPHTHALIMIDES AS ULTRAVIOLET LIGHT STABILIZERS FOR PLASTIC MATERIALS
Hans Dressler, Pitcairn, and Kenneth G. Reabe, Delmont, Pa., assignors to Koppers Company, Inc., a corporation of Delaware
No Drawing. Filed June 17, 1964, Ser. No. 375,949
7 Claims. (Cl. 260—45.8)

ABSTRACT OF THE DISCLOSURE

Aryl derivatives of 1,8-naphthalimides are disclosed as ultraviolet light stabilizers for polymer compositions. N-(2-hydroxyphenyl)-1,8-naphthalimide and N-(4-alkoxyphenyl)-1,8-naphthalimide are particularly effective as ultraviolet light stabilizers in polymers such as polyethylene, polypropylene, polystyrene, polyvinyl acetate, polyvinyl chloride, copolymer of vinylidene chloride and vinyl chloride, nitrocellulose, ethyl cellulose, cellulose acetate and poyester resins.

---

This invention relates to ultraviolet light stabilizers for plastics. In one specific aspect it relates to plastic compositions stabilized against degradation resulting from exposure to ultraviolet radiation.

It is well known that many plastic materials tend to undergo deterioration upon exposure to ultraviolet radiation. Light having wave lengths of about 290–400 millimicrons causes photocatalyzed changes, such as yellowing or embrittlement, in unstabilized polymers. This is particularly undesirable for colorless translucent and transparent plastics which are required to withstand long exposure to sunlight. To overcome this problem it is usually necessary to stabilize plastics, such as for use in translucent roofing, transparent structures, protective coating, impact resistant windows and decorative structures, which are subjected to prolonged exposure to ultraviolet radiation.

In recent years, organic compounds have become available which can absorb ultraviolet light and convert it to less harmful forms of energy such as heat, vibrational energy or less harmful radiation. These organic stabilizers, in addition to absorbing ultraviolet radiation in the selected range for the plastic material being treated, must be compatible with the plastic, have little or no initial color, be reasonably inexpensive, be chemically stable, and have a low toxicity especially for stabilizing plastics used in the food industry.

As a general rule, an effective ultraviolet light stabilizer should have a molar extinction coefficient ($\epsilon$) of about 10,000, that is, the log $\epsilon$ of the molar extinction coefficient is equal to or greater than 4.0 in the 300–400 millimicron spectral region to have potential value as an ultraviolet light stabilizer for plastics. However, individual plastics are generally most susceptible to deterioration by radiation of particular wave lengths. Thus, polyethylene and polystyrene are susceptible to radiation having a wave length of 300–320 millimicrons, while propylene is most sensitive to radiation at 370 millimicrons. One disadvantage of presently available commercial stabilizers is that their extinction coefficient is too low over a broad band in the ultraviolet light region to be effective for general use.

Quite surprisingly we have discovered that certain 1,8-naphthalimide derivatives are compatible with a large number of plastic materials and exhibit outstanding ultraviolet light absorbing properties over a wide range. These compounds do not impart any substantial color to transparent colorless plastics.

It is therefore an object of the present invention to provide plastic compositions containing 1,8-naphthalimide derivatives which are substantially resistant to ultraviolet deterioration.

In accordance with the present invention, we have discovered that derivatives of 1,8-naphthalimide are particularly useful as ultraviolet light stabilizing agents for plastic materials. These compounds have the formula

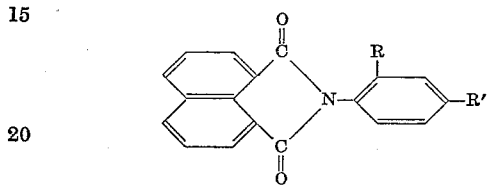

wherein R is a member selected from the group consisting of hydrogen and hydroxy and R' is a member selected from the group consisting of hydrogen and alkoxy having 1–12 carbon atoms. The compounds of the present invention are particularly compatible with polyethylene and polypropylene and give excellent stabilization of these plastics against deteriorating effects of ultraviolet light without causing any substantial discoloration of the plastics.

The ultraviolet light stabilizer can be readily incorporated into the plastic material by various standard procedures. In one technique, the dry stabilizer in powdered form is mixed with a powdered or granular plastic and the mixture is then appropriately treated by molding or extruding. In another procedure an aqueous suspension or emulsion of finely divided polymeric material may be admixed with a suspension or emulsion of the stabilizing agent. Alternatively it is possible to spray or mix a polymeric material in powdered or granular form with a solution or dispersion of the ultraviolet light absorbing agent in an appropriate solvent such as hexane or benzene. It is also possible to incorporate the ultraviolet absorbing agent in a finished article by introducing the plastic material into a bath containing the ultraviolet light absorbing agent in an appropriate liquid solvent and permitting the plastic material to remain in the bath for some time until the plastic has been properly treated. Thereafter, the material is dried to remove any of the remaining solvent. Plastic material in the form of fibers and films may also be sprayed with a solution or suspension of the agent absorbing ultraviolet rays in a solvent or dispersant by any standard technique.

The plastic material should contain a stabilizing amount of the ultraviolet light absorbing agent, that is, the amount of stabilizing agent sufficient to prevent deterioration and embrittlement of the plastic material. The amount of stabilizing agent to be used will depend to a large extent upon the amount of exposure to which plastic is subjected and the nature of the plastic to be treated. The agent is generally added in an amount of between 0.01 and 5 percent by weight of the plastic material and preferably between 0.1 and 4 percent by weight.

The stabilizing agent imparts protection against ultraviolet radiation to numerous plastic materials which are sensitive to ultraviolet light. These include, for example, clear films made of polyester resins, polyvinyl chloride and cellulose acetate which are used in packaging dye, textile articles and automobile seat covers. The agent also protects flame resistant halogen containing polyesters and styrene modified maleate gylcol resins used in the preparation of glass fiber reinforced structural panels which are subject to discoloration on outdoor exposure. The ultraviolet stabilizer is particularly effective for protecting polyethylene, polypropylene, polystyrene, polyvinyl acetate, polyvinyl chloride, copolymers of vinyl chloride and vinylidine chloride, cellulose resins such as nitrocellulose, ethylcellulose and cellulose acetate and numerous other materials. One outstanding property of the stabilizing agent is its heat stability making it particularly desirable when high molding or extrusion temperatures are required, e.g., for polycarbonates. The agent can be used alone or together with other additives such as fillers, antioxidants, pigments, etc.

The invention is further illustrated in the following examples:

Example I

A mixture of 40 g. (0.2 mole) of 1,8-naphthalic anhydride, 22 g. (0.2 mole) of o-aminophenol, 100 ml. of n-butyl alcohol and 100 ml. of toluene was refluxed for 6 hours and 3.1 ml. of water removed. The hot mixture was decanted and the residue slurried in toluene and filtered to obtain 47.2 g. of dark grey solid, M.P.>300° C. 10 g. of the crude product was recrystallized from 75 ml. of nitrobenzene to obtain 8.7 g. of product, M.P. 325–330° C. This corresponds to a yield of 71 percent of theory. Its infrared spectrum was consistent with the structure, N-(2-hydroxyphenyl)-1,8-naphthalimide and its ultraviolet spectrum showed maxima at 231, 276, and 333 millimicrons having, respectively, log $\epsilon$ of 4.66, 3.66, and 4.14.

Example II

A mixture of 40 grams (0.20 mole) of 1,8-naphthalic anhydride, 28 grams (0.2 mole) of p-phenetidine, 200 ml. of n-butanol, and 100 ml. of xylene was refluxed for six hours. The water formed during the reaction (3.3 ml.) was collected in a Dean-Stark trap. The supernatant liquor was decanted hot and the pale yellow insoluble solid washed with butanol and xylene, and dried to give 45.4 grams of product, M.P. 229–237° C. Recrystallization of 20 g. from 50 ml. of o-dichlorobenzene gave 19.2 g. (96 percent recovery) of nearly colorless crystals of N-(4-ethoxyphenyl)-1,8-naphthalimide, M.P. 233–6° C. This corresponds to a yield of 68 percent of the theoretical. The infrared spectrum was consistent with N-(4-ethoxyphenyl)-1,8-naphthalimide, and its ultraviolet spectrum indicated usefulness as a stabilizer.

Example III

The products of Example I, N-(2-hydroxyphenyl)-1,8-naphthalimide and Example II, N-(4-ethoxyphenyl)-1,8-naphthalimide, were tested to determine their ability to stabilize polystyrene against ultraviolet light degradation. The stabilizer in varying amounts was blended with 100 parts of polystyrene beads by rolling in a jar mill. The stabilized bead samples and a control sample were extruded into pellets from which discs 2 inches in diameter and 1/8 inch thick were molded by injection molding. These molded discs were then exposed to ultraviolet radiation under a 325 watt Hanovia lamp for 120 hours. A Yellowness Index, which represents the relative degree of yellow coloration based upon spectrophotometric analysis, was determined for the samples of each of the compositions. The difference in the Yellowness Index before and after exposure or the amount of discoloration caused by the ultraviolet radiation is designated as the "Yellowness Factro." Results of the test are given in the table below.

TABLE I

| Stabilizer | Weight Percent | Yellowness Index | | Yellowness Factor |
|---|---|---|---|---|
| | | Before Exposure | After Exposure | |
| N-(2-Hydroxyphenyl)-1,8-naphthalimide | 0.1 | 9.8 | 13.5 | 3.7 |
| N-(4-Ethoxyphenyl)-1,8-naphthalimide | 0.1 | 7.1 | 9.5 | 2.4 |
| Do | 0.05 | 6.8 | 12.0 | 5.2 |
| Do | 0.02 | 8.0 | 13.6 | 5.6 |
| Control | None | 8.4 | 15.3 | 6.9 |

Example IV

One part of N-(2-hydroxyphenyl)-1,8-naphthalimide is blended with 100 parts of low density polyethylene and 0.05 part 4,4'-thiobis(6-t-butyl-m-cresol) by milling on a two roll mill at 320° F. for five minutes. Another sample is prepared by blending one part N-(4-ethoxyphenyl)-1,8-naphthalimide. The clear thin films, 0.05 mm. thick, are molded from the stabilized resin and visual inspection indicates that the resin and the stabilizer are completely compatible. These films were exposed for 500 hours to the light of an ultraviolet lamp. The stabilized films remain substantially unchanged and no embrittlement can be ascertained while the unstabilized films show discoloration and embrittlement.

Similar results are obtained when polypropylene, copolymers of vinylidine chloride and vinyl chloride, or styrene modified maleicglycol polyesters are used in the foregoing example.

We claim:

1. A polymeric composition stabilized against ultraviolet degradation comprising a polymer selected from the group consisting of polyethylene and polystyrene, said stabilized composition containing from 0.01 to 5% by weight of said polymer of a stabilizer having the formula:

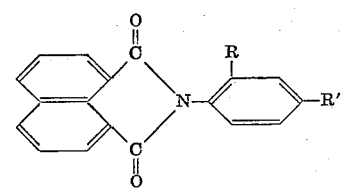

wherein R is a member selected from the group consisting of hydrogen and hydroxy and R' is a member selected from the group consisting of hydrogen and alkoxy having 1–12 carbon atoms.

2. The stabilized polymeric composition of claim 1 wherein said stabilizer is N-(2-hydroxyphenyl)-1,8-naphthalimide.

3. The stabilized polymeric composition of claim 1 wherein said stabilizer is N-(4-alkoxyphenyl)-1,8-naphthalimide.

4. The stabilized polymeric composition of claim 1 wherein said polymer is polystyrene and said stabilizer is N-(2-hydroxyphenyl)-1,8-naphthalimide.

5. The stabilized polymeric composition of claim 1 wherein said polymer is polystyrene and said stabilizer is N-(4-alkoxyphenyl)-1,8-napthalimide.

6. The stabilized polymeric composition of claim 1 wherein said polymer is polyethylene and said stabilizer is N-2-hydroxyphenyl)-1,8-napthalimide.

7. The stabilized polymeric composition of claim 1 wherein said polymer is polyethylene and said stabilizer is N-(4 alkoxyphenyl) 1,8-napthalimide.

References Cited
UNITED STATES PATENTS

| | | | |
|---|---|---|---|
| 2,574,987 | 11/1951 | Shelly | 260—45.8 |
| 3,148,163 | 9/1964 | Freyermuth | 260—45.8 |

JULIUS FROME, *Primary Examiner.*